W. B. GRAHAM.
FEEDING DEVICE FOR POULTRY.
APPLICATION FILED OCT. 29, 1919.

1,363,775.
Patented Dec. 28, 1920.

Inventor,
William B. Graham, by
G.C. Kennedy,
Attorney.

UNITED STATES PATENT OFFICE.

WILLIAM B. GRAHAM, OF WATERLOO, IOWA.

FEEDING DEVICE FOR POULTRY.

1,363,775.          Specification of Letters Patent.          Patented Dec. 28, 1920.

Application filed October 29, 1919. Serial No. 334,194.

*To all whom it may concern:*

Be it known that I, WILLIAM B. GRAHAM, a citizen of the United States of America, and a resident of Waterloo, Blackhawk county, Iowa, have invented certain new and useful Improvements in Feeding Devices for Poultry, of which the following is a specification.

My invention relates to improvements in feeding devices for poultry, and the object of my improvement is to furnish an open-work structure adapted to be removably placed over or about a supply of food or drink for fowls or animals, which, while permitting access thereto, will prevent waste or fouling of such substances.

Figure 1:
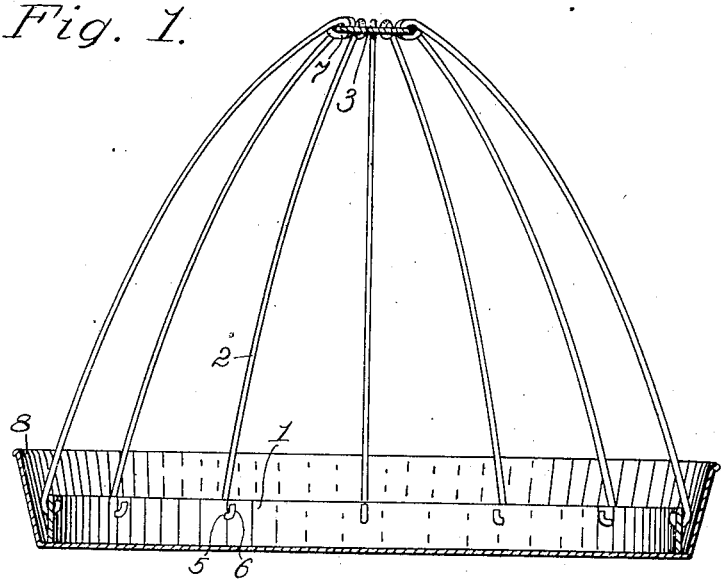
Figure 2:
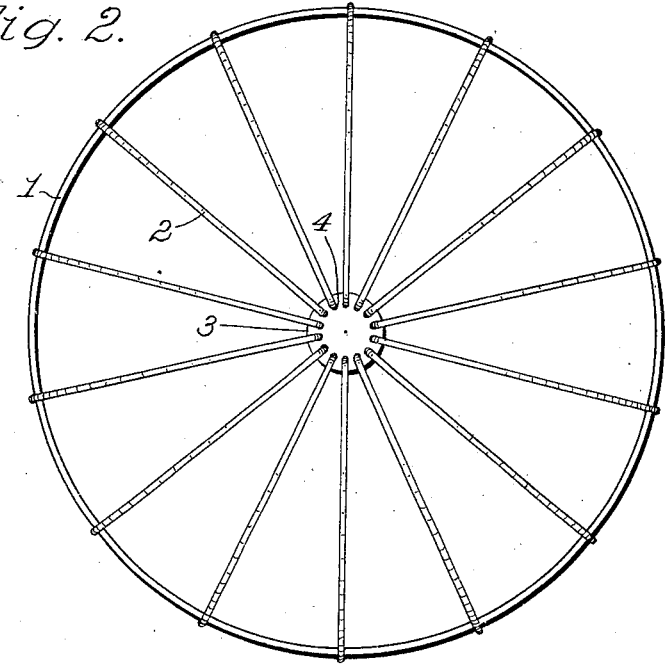

This object I have accomplished by the means hereinafter described and claimed, and which are illustrated in the accompanying drawings, in which Figure 1 is a cross-sectional view of my said device as placed upon a basal food container, and Fig. 2 is a plan view of the device without said container.

Similar numerals of reference denote similar parts throughout said views.

The numeral 1 denotes a basal ring of cylindrical form, having a plurality of small equidistantly spaced orifices 5 near its upper marginal edge.

The numeral 3 denotes a small circular plate positioned at a suitable distance horizontally above the center of the ring 1, and has a like plurality of small equidistantly spaced orifices 4 near its edge.

The numeral 2 denotes a like plurality of outwardly curved rods having their lower extremities formed into hooks 6 which are passed through the orifices 5 in said ring and clenched against the latter, their upper extremities being formed into similar hooks 7 which are passed downwardly through the orifices 4 in said plate 3 and clenched about the marginal edge of the latter, whereby a rigid open-work structure is provided, the rods 2 being equally spaced apart a suitable distance.

This open-work domical-structure may be placed upon a suitable base, plate or container 8 which latter may have a raised rim. Food substances placed on said container 8 within the structure described, are accessible to fowls, which, nevertheless, are prevented by the spaced rods 2 from crowding upon the food or fouling it, and the structure is such that fowls cannot obtain a foothold upon it to roost thereon.

A receptacle containing water or any liquid or solid substances, may be removably placed within and under said structure and be equally accessible, also, the device may be placed about substances without use of an underlying plate or container 8, or an interior receptacle.

By the use of the device, waste of food is prevented, as fowls or animals cannot withdraw and scatter portions upon the ground.

The device may be varied in shape, the form and arrangement of its parts and connections, and in dimensions, without departing from the principle of the invention.

Having described my invention, what I claim as new, and desire to secure by Letters Patent, is:

A device of the character described, comprising a horizontal basal ring of cylindric form having a plurality of horizontally spaced orifices alined below its upper edge, a small horizontal disk positioned above the ring coaxially, and wires having loops at opposite ends, said disk having marginal orifices, and the loops of said wires at opposite ends passed through the adjacent orifices of the disk and ring lockingly and curved domically, the ring serving as a retaining wall for feed placed therein.

Signed at Waterloo, Iowa, this 11th day of October, 1919.

WILLIAM B. GRAHAM.